United States Patent
Robb

(10) Patent No.: US 7,846,877 B1
(45) Date of Patent: Dec. 7, 2010

(54) METHODS FOR TREATING A WELL USING A TREATMENT FLUID CONTAINING A WATER-SOLUBLE POLYSACCHARIDE, A WATER-SOLUBLE SALT, AND UREA

(75) Inventor: Ian D. Robb, Lawton, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 43 days.

(21) Appl. No.: 12/454,600

(22) Filed: May 20, 2009

(51) Int. Cl.
*C09K 8/68* (2006.01)
*E21B 43/16* (2006.01)

(52) U.S. Cl. .................. 507/211; 166/305.1; 507/213; 507/239; 507/244; 507/268; 507/269; 507/277

(58) Field of Classification Search ............. 507/211, 507/213, 239, 244, 268, 269, 277; 166/305.1
See application file for complete search history.

(56) References Cited

U.S. PATENT DOCUMENTS

2006/0157248 A1* 7/2006 Hoefer et al. ............... 166/300

* cited by examiner

*Primary Examiner*—Timothy J. Kugel
(74) *Attorney, Agent, or Firm*—Robert A. Kent; Booth Albanesi Schroeder LLC

(57) ABSTRACT

Methods are provided for treating a portion of a well and include the steps of: (a) forming a treatment fluid comprising an aqueous solution, wherein the aqueous solution comprises: (i) water; (ii) a water-soluble polysaccharide; (iii) one or more water-soluble salts, wherein the one or more salts are selected and are in at least a sufficient concentration such that the water-salt solution has a density of at least 10 ppg; and (iv) urea; and (b) introducing the treatment fluid into the portion of the well. According to the inventions, the concentration of the urea in the water is in at least a sufficient concentration such that aqueous solution: (1) has a G' of at least 2 Pa, or (2) is filterable. According to the inventions, an identical aqueous solution except with less than the sufficient concentration of the urea would not satisfy the above conditions.

26 Claims, 2 Drawing Sheets

METHODS FOR TREATING A WELL USING A TREATMENT FLUID CONTAINING A WATER-SOLUBLE POLYSACCHARIDE, A WATER-SOLUBLE SALT, AND UREA

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

SUMMARY

Methods according to the inventions are directed to treating a subterranean formation for producing oil or gas.

According to a first aspect of the inventions, a method is provided for treating at least a portion of a well, the method includes the steps of: (a) forming a treatment fluid comprising an aqueous solution, wherein the aqueous solution comprises: (i) water; (ii) a water-soluble polysaccharide; (iii) one or more water-soluble salts, wherein the one or more salts are selected and are in at least a sufficient concentration such that the water-salt solution has a density of at least 10 ppg; and (iv) urea; wherein the concentration of the urea in the water is in at least a sufficient concentration such that the aqueous solution has a G' of at least 2 Pa whereas an identical aqueous solution except with less than the sufficient concentration of the urea would not have a G' of at least 2 Pa, and wherein G' is measured in the linear viscoelastic region at least one desired temperature in the range of 10° C.-50° C. without any increase in temperature of the aqueous solution above the desired temperature; and (b) introducing the treatment fluid into the well.

According to another aspect of the inventions, a method is provided for treating at least a portion of a well, the method includes the steps of: (a) forming a treatment fluid comprising an aqueous solution, wherein the aqueous solution comprises: (i) water; (ii) a water-soluble polysaccharide; (iii) one or more water-soluble salts, wherein the one or more salts are selected and are in at least a sufficient concentration such that the water-salt solution has a density of at least 10 ppg; and (iv) urea; wherein the concentration of the urea in the water is in at least a sufficient concentration such that the aqueous solution is filterable, whereas an identical aqueous solution except with less than the sufficient concentration of the urea would not be filterable; and (b) introducing the treatment fluid into the well. As used herein, "filterable" means that at least 100 g of the aqueous solution is capable of being passed within 100 seconds through an 11-micron filter paper (i.e., Whatman® filter paper or equivalent) with a circular filtration area having a diameter of 5.4 cm, at a differential pressure of 50 psi, and at a temperature of 30° C.

The features and advantages of the present inventions will be more readily appreciated when considered in conjunction with the accompanying drawing.

BRIEF DESCRIPTION OF THE DRAWING

The accompanying drawing is incorporated into the specification to illustrate examples according to the presently most-preferred embodiment of the present inventions. The drawing is not to be construed as limiting the inventions. The drawing includes the following figures.

DETAILED DESCRIPTION OF THE INVENTION

Figure 1:
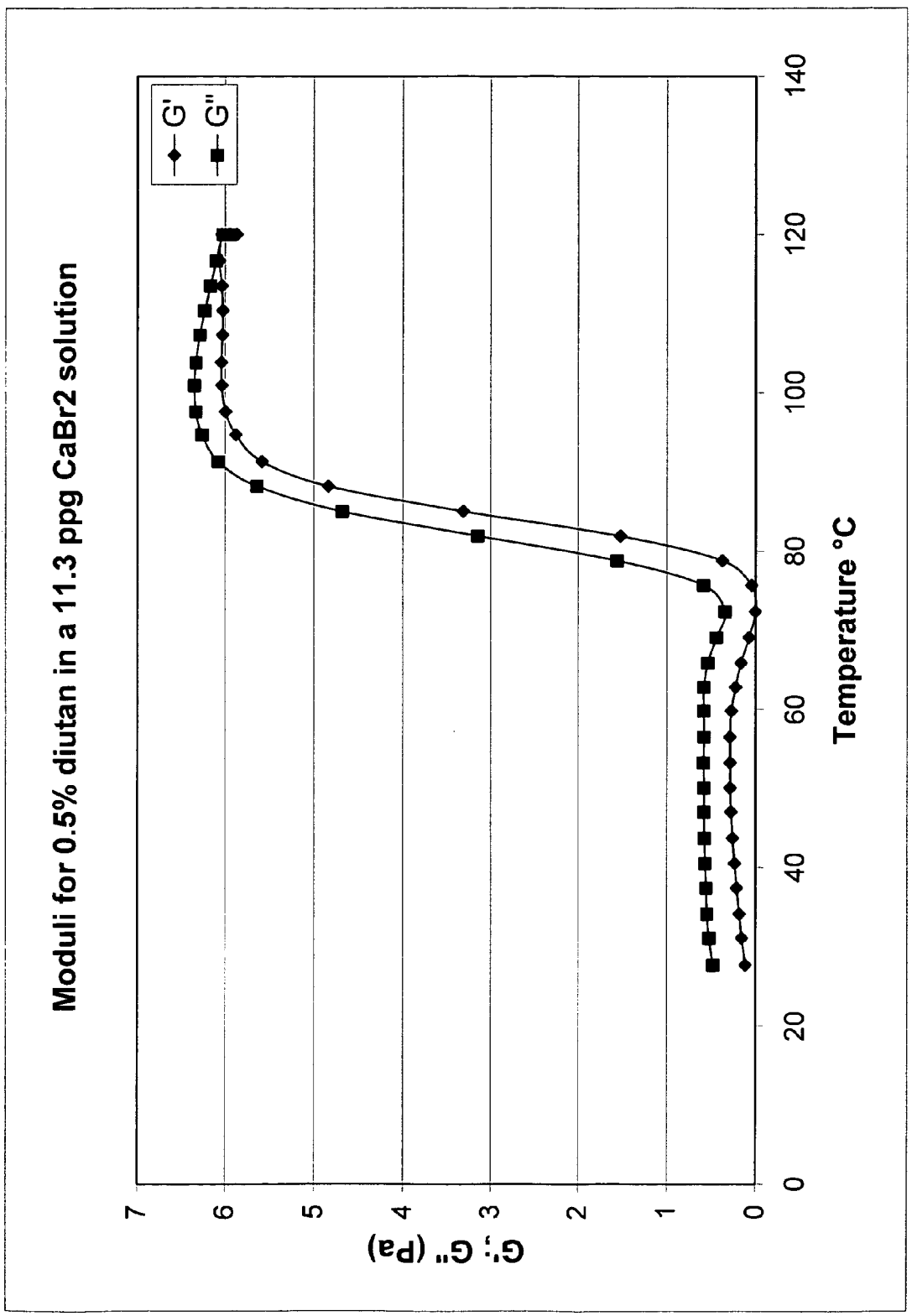
FIG. 1 is a graph of G' and G" versus temperature for an aqueous solution containing 0.5% diutan and a calcium bromide ($CaBr_2$) salt solution having a density of 11.3 pounds per gallon (ppg).

Oil and gas hydrocarbons are naturally occurring in some subterranean formations. A subterranean formation containing oil or gas is sometimes referred to as a reservoir. A reservoir may be located under land or offshore. To produce oil or gas from a reservoir, a well is drilled into the earth.

It is often desirable to treat at least a portion of a well with a treatment fluid in the effort to produce oil or gas from a reservoir. A treatment is designed to resolve a specific condition in a well. For example, stimulation is a treatment performed on a well to restore or enhance the productivity of a well.

As used herein, a "treatment fluid" is a fluid designed and prepared to resolve a specific condition of a well or subterranean formation, such as for stimulation, isolation, gravel packing, or control of reservoir gas or water. The term "treatment fluid" refers to the specific composition of the fluid as it is being introduced into a wellbore. The term "treatment" in the term "treatment fluid" does not necessarily imply any particular action by the fluid.

Stimulation treatments fall into two main groups, hydraulic fracturing and matrix treatments. In a fracturing treatment, a treatment fluid is injected into a wellbore and into a subterranean formation penetrated by the wellbore at a pressure that is above the fracture pressure of the subterranean formation, which higher fluid pressure fractures the formation to create a flow path between the subterranean formation and the wellbore. Hydraulic fracturing is described in more detail below. In a matrix treatment, a treatment fluid is injected into a wellbore and into a subterranean formation penetrated by the wellbore at a pressure that is below the fracture pressure of the subterranean formation, which lower fluid pressure is sufficient to force the treatment fluid into the matrix of the formation but not sufficient to fracture the subterranean formation.

As mentioned above, "hydraulic fracturing" is a common stimulation treatment. A treatment fluid adapted for this purpose sometimes is referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

Fracturing a subterranean formation typically requires many thousands of gallons of fracturing fluid. Further, it is often desirable to fracture at more than one downhole location of a well. Thus, a high volume of fracturing fluid usually is required to treat a well, which means that a low-cost fracturing fluid is desirable. Because of the ready availability and relative low cost of water compared to other liquids, a fracturing fluid usually is water based. As used herein, a "water-based" fluid means a homogenous fluid of water or an aqueous solution or a heterogeneous fluid comprising water or an aqueous solution as the continuous phase.

After the pumping of the fracturing fluid is stopped, the fracture will tend to close. To prevent the fracture from closing, a material, called proppant, is placed in the fracture to keep the fracture propped open. Proppant is usually in the form of an insoluble particulate, which is suspended in the fracturing fluid, carried downhole, and deposited in the fracture. The proppant holds the fracture open while still allowing fluid flow through the permeability of the proppant. When deposited in the fracture, the proppant forms a "proppant pack," and, while holding the fracture open, provides conductive channels through which fluids can flow to the wellbore. These channels provide an additional flow path for the oil or gas to reach the wellbore, which increases oil and gas production from the well. For this purpose, an insoluble particulate for use as proppant is selected based on two characteristics: particulate size range and strength.

A particulate for use as a proppant must have an appropriate size to be placed in the fracture, prop open the fracture as a proppant pack, and allow fluid to flow through the proppant pack, i.e., in between and around the proppant particulate making up the pack. Appropriate sizes of particulate for use as a proppant are typically in the range from about 8 to about 100 U.S. Standard Mesh. A typical proppant is sand, which geologically is defined as having a particle size ranging in diameter from about 0.0625 millimeters (1/16 mm) up to about 2 millimeters. The next smaller size class in geology is silt, particles smaller than 0.0625 mm down to 0.004 mm in diameter. The next larger size class in geology is gravel, with particles ranging from greater than 2 mm up to 64 mm. As used herein, this geological definition of gravel size class will not apply to a slurry to be pumped downhole, as such particles are so large they would plug up pumps.

The particulate material of a proppant must have sufficient strength to prop a fracture open and to allow fluid flow through a pack of the particulate material in the fracture. For a proppant material that crushes under closure stress, the proppant preferably has an API crush strength of at least 2,000 psi closure stress based on 10% crush fines. The proppant can be coated with a resin to help improve the strength of the proppant.

As used herein, "proppant" means and refers to an insoluble particulate material that is suitable for use as a proppant pack, including without limitation sand, synthetic materials, manufactured materials, and any combination thereof in any proportion. For this purpose, "proppant" does not mean or refer to suspended solids, silt, fines, or other types of insoluble particulate smaller than 0.0625 mm. Further, it does not mean or refer to insoluble particulate larger than 2 mm. "Proppant" also does not mean or refer to dissolved solids.

Suitable proppant materials include, but are not limited to, sand (silica), walnut shells, sintered bauxite, glass beads, plastics, nylons, resins, other synthetic materials, and ceramic materials. Mixtures of proppants can be used as well. If sand is used, it typically will be from about 20 to about 100 U.S. Standard Mesh in size. For a synthetic proppant, typically mesh sizes about 8-100 are used. The concentration of proppant in a fracturing fluid can be in any concentration known in the art, and preferably will be in the range of from about 0.01 kilogram to about 3 kilogram of proppant added per liter of liquid phase (about 0.1 lb/gal-25 lb/gal).

An insoluble particulate also can be used for "gravel packing" operations in a well. The insoluble particulate, when used for this purpose, is referred to as "gravel." If the insoluble particulate is for gravel packing, its compressive strength or crush resistance is less critical. More particularly in the oil and gas field and as used herein, the term "gravel" is sometimes used to refer to relatively large particles in the sand size classification, that is, particles ranging in diameter from about 0.5 mm up to about 2 mm.

In a gravel packing operation, a treatment fluid containing "gravel" is introduced through the wellbore and into the subterranean formation to be treated. The gravel, once located in the subterranean formation, forms a "gravel pack." The aqueous solution of the treatment fluid should be filterable so that it would be capable of passing through the formed gravel pack. The aqueous solution of the treatment fluid can be tested for this capability by measuring the flow of the aqueous solution of the treatment fluid (i.e., the treatment fluid without any gravel or other insoluble material), through a standard filter paper under applied pressure. Significant quantities of cross-linked polymers or partially-soluble polymers can adversely affect the filterability of the aqueous solution of a treatment fluid to be used in a gravel packing operation. Therefore, it is common for a treatment fluid used in gravel packing operations to contain only small quantities, if any, of cross-linked or partially-soluble polymers.

The insoluble material for use as proppant or gravel typically has a much higher specific gravity than deionized water measured at 25° C. (77 F) and 1 atmosphere pressure. For example, sand has a specific gravity of about 2.7. Such a proppant suspended in water will tend to settle out from the water. To help suspend the proppant (or other particulate with a substantially different density than water) in a water-based fracturing fluid, it is common to use a suspending agent to help suspend the proppant and prevent the proppant from separating out of the treatment fluid. As used herein, a "suspending agent" is a substance that is capable of suspending insoluble particulates such as proppant or gravel in a fluid. A common suspending agent used in treatment fluids is a polysaccharide.

A suspending agent tends to gel a fluid, which can be useful in suspending an insoluble particulate in the fluid. Historically, the gel characteristics of a fluid have not been easy to measure directly, however, a viscosity measurement can be used as an indicator of the capacity of a fluid to suspend and transport a particulate. Accordingly, a suspending agent sometimes has been referred to as a viscosity-increasing agent. Viscosity is the resistance of a fluid to flow, defined as the ratio of shear stress to shear rate. The viscosity of a well treatment fluid usually is expressed in the unit centipoise ("cP"). Viscosity must have a stated or an understood shear rate and measurement temperature in order to be meaningful.

While viscosity tends to correlate with the suspending capability of a fluid, viscosity is not necessarily a measure of the suspending ability of a fluid. Even if the viscosity of a treatment fluid is high, that does not mean the treatment fluid necessarily can suspend an insoluble particulate such as proppant or gravel.

More accurately, a suspending agent increases the elastic modulus and loss modulus of a fluid. The elastic modulus and loss modulus of a fluid are measurements that can be related directly to the suspending capability of a suspending agent in a treatment fluid, e.g., how well the suspending agent will suspend proppant or gravel in the treatment fluid. For example, a fluid with a high suspending capability will have a higher elastic modulus value compared to a fluid without such a high suspending capability.

Elastic modulus (G') is a measure of the tendency of a substance to be deformed elastically when a force is applied to it. Elastic modulus is expressed in units of pressure, for example, Pa (Pascals) or dynes/cm$^2$. Loss modulus (G") is a measure of the energy lost when a substance is deformed. G" is also expressed in units of pressure, for example, Pa (Pascals) or dynes/cm². When comparing G' to G" of a fluid, the units of both G' and G" should be the same. Temperature can have an effect on the elastic modulus of a fluid and the loss modulus of a fluid. In general, the elastic modulus and loss modulus of a fluid will be different for a fluid tested at 30° C. compared to a fluid tested at 100° C. More particularly, the elastic modulus and loss modulus of a fluid usually tend to decrease as the temperature of the fluid increases. Thus, in stating the elastic modulus or loss modulus of a fluid, it is important to state the temperature at which the measurement is made.

Because of the high volume of fracturing fluid typically used in a fracturing operation, it is desirable to increase the elastic modulus of the fracturing fluid to the desired elastic modulus using as little suspending agent as possible. Being able to use only a small concentration of the suspending agent requires a lesser amount of the suspending agent in order to achieve the desired elastic modulus in a large volume of fracturing fluid.

Efficient and inexpensive suspending agents typically comprise a water-soluble polymer. More preferably, the water-soluble polymer is a polysaccharide such as guar, xanthan, or diutan.

To further increase the gelling of a fluid, the suspending agent can be cross linked. As used herein, a "cross link" or "cross linking" is a connection between two or more polymer molecules.

Optionally, one or more other additives can be included to form a treatment fluid to be delivered into a wellbore for various purposes. For example, a treatment fluid commonly includes a breaker. A breaker is a chemical used for the purpose of diminishing or "breaking" the viscosity and elastic modulus of the fluid so that this fluid can be recovered more easily from the formation during cleanup. Types of breakers include, for example, oxidizers, enzymes, or acids, including delayed release or encapsulated breakers.

A treatment fluid can include a surfactant. For example, a surfactant may be used for its ability to aid the dispersion and/or stabilization of a gas component into the fluid.

Further, a treatment fluid can contain other materials, additives, and chemicals that are used in oil field applications. These include, but are not necessarily limited to, a breaker aid, a co-surfactant, an oxygen scavenger, an alcohol, a scale inhibitor, a corrosion inhibitor, a fluid-loss additive, an oxidizer, a bactericide, a biocide, a microemulsion, and the like. The treatment fluid can also include a gas for foaming the fluid.

One of the most common components of a treatment fluid is a water-soluble salt. A salt may be naturally occurring in the water source (as in seawater). A salt can be added to help make a treatment fluid be more chemically compatible with the subterranean formation. A salt can be included to increase the density of a treatment fluid. A salt used to increase the density of the treatment fluid can be selected based on a sufficient density and sufficient solubility such that the water-salt solution of the treatment fluid has a density of at least 10 pounds per gallon (ppg). For example, a salt having a sufficient density is a salt having a density of at least 1.5 g/cm³. For example, a salt having a sufficient solubility is a salt that is capable of dissolving at least 1.5 lbs of salt per gallon of deionized water (268 g/L). For example, metal salts, such as calcium bromide ($CaBr_2$) or sodium bromide (NaBr), can be added to the treatment fluid in a high concentration to give a water-salt solution having a density in the range of 10.0 to 15.0 pounds per gallon (ppg). Other examples of water-soluble metal salts that can be in a treatment fluid include zinc bromide, calcium chloride, and potassium formate, and any combination thereof in any proportion.

The presence of salt, however, especially in a high concentration, can make it difficult to dissolve certain types of polysaccharides in an aqueous fluid. This is known to be a problem for xanthan and diutan, for example. If the polysaccharide is inhibited from dissolving, then a lower G' value will be observed for the fluid compared to a fluid having a higher dissolved concentration of the polysaccharide. It is important that a treatment fluid have a desired G' value (or desired viscosity as a proxy for the suspending capability) to be able to suspend a desired concentration of proppant or gravel at the time the treatment fluid is introduced into a wellbore of a well.

Various techniques can be used to help dissolve the polysaccharide. For example, if xanthan or diutan does not dissolve in an aqueous solution having a high concentration of salt at 30° C., the fluid can be heated to above 70° C. to help dissolve the xanthan or diutan. Unfortunately, such an added process of heating the fluid to help dissolve a polysaccharide is very expensive.

For a fluid tested at 30° C., the elastic modulus or loss modulus of the fluid can be different if the fluid is not heated beyond 30° C. compared to a fluid that is heated above 30° C., for example to 80° C., and then cooled back down to 30° C. As used herein, a G' value at a stated temperature for a fluid is measured without any heating of the fluid above that temperature.

According to a first aspect of the inventions, a method is provided for treating a portion of a well, where the method includes the steps of: (a) forming a treatment fluid comprising an aqueous solution, wherein the aqueous solution comprises: (i) water; (ii) a water-soluble polysaccharide; (iii) one or more water-soluble salts, wherein the one or more salts are selected and are in at least a sufficient concentration such that the water-salt solution has a density of at least 10 ppg; and (iv) urea; wherein the concentration of the urea in the water is in at least a sufficient concentration such that the aqueous solution has a G' of at least 2 Pa whereas an identical aqueous solution except with less than the sufficient concentration of the urea would not have a G' of at least 2 Pa, and wherein G' is measured in the linear viscoelastic region at least one desired temperature in the range of 10° C.-50° C. without any increase in temperature of the aqueous solution above the desired temperature; and (b) introducing the treatment fluid into the well.

According to another aspect of the inventions, a method is provided for treating a portion of a well, where the method includes the steps of: (a) forming a treatment fluid comprising an aqueous solution, wherein the aqueous solution comprises: (i) water; (ii) a water-soluble polysaccharide; (iii) one or more water-soluble salts, wherein the one or more salts are selected and are in at least a sufficient concentration such that the water-salt solution has a density of at least 10 ppg; and (iv) urea; wherein the concentration of the urea in the water is in at least a sufficient concentration such that the aqueous solution is filterable, whereas an identical aqueous solution except with less than the sufficient concentration of the urea would not be filterable; and (b) introducing the treatment fluid into the well.

Preferably, the aqueous solution of the treatment fluid has a G' of at least 2 Pa measured in the linear viscoelastic region at a temperature of 30° C. and is filterable. The aqueous solution preferably has a G' of at least 5 Pa measured in the linear viscoelastic region at a temperature of 30° C. Preferably, the aqueous solution has a G' of at least 10 Pa measured in the linear viscoelastic region at a temperature of 40° C.

More preferably, the aqueous solution has a G' of at least 10 Pa measured in the linear viscoelastic region at a temperature of 30° C.

Preferably, the treatment fluid is introduced into a wellbore of the well at a temperature below 40° C. More preferably, the treatment fluid is introduced into a wellbore at a temperature at or below 30° C. Most preferably, the treatment fluid is introduced into a wellbore of the well without any prior heating of the water of the treatment fluid to help dissolve the polysaccharide in the water of the treatment fluid.

As used herein, the term "water-soluble polysaccharide" means the polysaccharide is at least 10 g/L soluble in deionized water at a temperature of 25° C. (77° F.) and a pressure of 1 atmosphere. As used herein, the term "water-soluble salt" means that the water-soluble salt has at least a sufficient density and is at least sufficiently water soluble such that it is possible to make a water-salt solution of water and the salt having a density of at least 10 lb/gal. Preferably, at least 1.5 lbs of the salt dissolves in 1 gal of deionized water (268 g/L) at a temperature of 25° C. (77° F.) and a pressure of 1 atmosphere. Preferably, the water-soluble salt has a density of at least 1.5 g/cm$^3$.

Preferably, the polysaccharide is selected from the group consisting of diutan, xanthan, and any combination thereof in any proportion. Preferably, the polysaccharide is in a concentration at least 0.1% by weight of the water in the aqueous solution. More preferably, the polysaccharide is in a concentration in the range of 0.1% to 1.0% by weight of the water in the aqueous solution.

Preferably, the treatment fluid contains a water-salt solution having a density in the range of 10.5-15.5 ppg. The one or more salts are selected from the group consisting of sodium bromide, sodium chloride, calcium bromide, calcium chloride, zinc bromide, zinc chloride, and any combination thereof in any proportion.

Preferably, the urea is in a concentration of at least 5% by weight of the water in the aqueous solution. More preferably, the urea is in a concentration in the range of 12%-35% by weight of the water in the aqueous solution.

The treatment fluid can include an insoluble particulate selected from the group consisting of proppant and gravel. Preferably, the insoluble particulate is gravel. Preferably, the gravel has a size distribution such that 90% of the gravel is in the range of 0.5 mm to 2 mm.

The treatment fluid can include a cross-linking agent for the polysaccharide. The treatment fluid can optionally include a breaker. The breaker can be in a delayed-release form. For example, the breaker can be in the form of a delayed-release capsule.

The methods of the inventions can also include the step of introducing a breaker into the portion of well after the step of introducing the treatment fluid into the portion of the well. If the breaker is in a delayed-release form, the methods of the inventions can further include the step of simultaneously introducing the breaker with the treatment fluid into the portion of the well.

Figure 2:
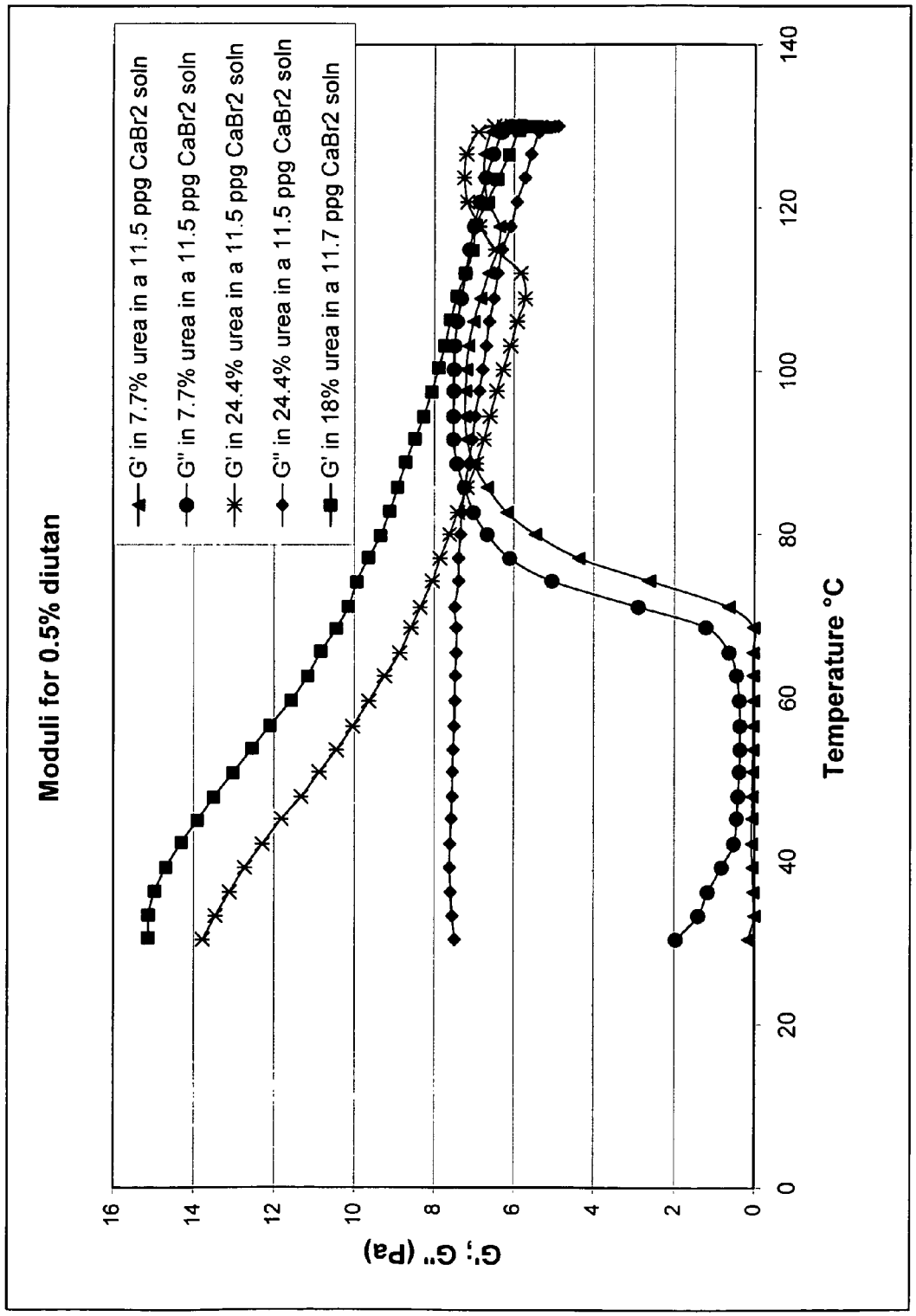
FIG. 2 is a graph of G' and G" in Pa versus temperature for several aqueous solutions containing 0.5% diutan and varied concentrations of urea in $CaBr_2$ salt solutions having varied densities.

FIGS. 1 and 2 illustrate examples of aqueous solutions according to the presently most-preferred embodiment of the present inventions. FIG. 1 is a graph of the elastic modulus (G') and loss modulus (G") in Pascal (Pa) versus temperature of an aqueous solution containing 0.5% diutan by volume and a calcium bromide (CaBr$_2$) salt solution having a density of 11.3 pounds per gallon (ppg). The data show that the fluid has a low G' at lower temperatures, but as the temperature of the fluid is increased, G' increases. The low G' values at lower temperatures indicate that the diutan is not as dissolved at these lower temperatures, and, therefore, the fluid has less suspending capability at these lower temperatures.

FIG. 2 is a graph of G' and G" in Pascal (Pa) versus temperature of aqueous solutions containing 0.5% diutan by volume and varied concentrations of urea in CaBr$_2$ salt solutions having varied densities. As can be appreciated from the data, the fluid containing 7.7% urea by volume exhibits a G' curve similar to a fluid without urea. Conversely, the fluids containing 18% and 24.4% urea by volume have higher G' values in the temperature range of approximately 30° C. to approximately 70° C. compared to the fluids with either 0% or 7.7% urea by volume. The high G' values indicate that the diutan is more dissolved at lower temperatures in the fluids containing 18% or 24.4% urea compared to the fluids containing 0% or 7.7% urea. The 18% and 24.4% urea fluids have an increased suspending capability at the lower temperatures compared to the fluids containing 0% and 7.7% urea.

What is claimed is:

1. A method for treating at least a portion of a well, the method comprising the steps of:
   (a) forming a treatment fluid comprising an aqueous solution, wherein the aqueous solution comprises:
      (i) water;
      (ii) a water-soluble polysaccharide;
      (iii) one or more water-soluble salts, wherein the one or more salts are selected and are in at least a sufficient concentration such that the water-salt solution has a density of at least 10 ppg; and
      (iv) urea;
   wherein the concentration of the urea in the water is in at least a sufficient concentration such that the aqueous solution has a G' of at least 2 Pa whereas an identical aqueous solution except with less than the sufficient concentration of the urea would not have a G' of at least 2 Pa, and
   wherein G' is measured in the linear viscoelastic region at least one desired temperature in the range of 10° C.-50° C. without any increase in temperature of the aqueous solution above the desired temperature; and
   (b) introducing the treatment fluid into the well.

2. The method according to claim 1, wherein the aqueous solution is filterable.

3. The method according to claim 2, wherein the treatment fluid is introduced into the well at a temperature below 40° C.

4. The method according to claim 2, wherein the treatment fluid is introduced into the well at a temperature at or below 30° C.

5. The method according to claim 1, wherein the treatment fluid further comprises an insoluble particulate.

6. The method according to claim 5, wherein the insoluble particulate comprises gravel.

7. The method according to claim 1, wherein the aqueous solution has a G' of at least 5 Pa and the desired temperature is 30° C.

8. The method according to claim 1, wherein the aqueous solution has a G' of at least 10 Pa and the desired temperature is 40° C.

9. The method according to claim 1, wherein the aqueous solution has a G' of at least 10 Pa and the desired temperature is 30° C.

10. The method according to claim 1, wherein the polysaccharide is selected from the group consisting of diutan, xanthan, and any combination thereof in any proportion.

11. The method according to claim 1, wherein the polysaccharide is in a concentration at least 0.1% by weight of the water in the aqueous solution.

12. The method according to claim 1, wherein the polysaccharide is in a concentration in the range of 0.1% to 1.0% by weight of the water in the aqueous solution.

13. The method according to claim 1, wherein the one or more salts are selected from the group consisting of sodium bromide, sodium chloride, calcium bromide, calcium chloride, zinc bromide, zinc chloride, and any combination thereof in any proportion.

14. The method according to claim 1, wherein the water-salt solution has a density in the range of 10.5 ppg-15.5 ppg.

15. The method according to claim 1, wherein the urea is in a concentration of at least 5% by weight of the water in the aqueous solution.

16. The method according to claim 1, wherein the urea is in a concentration in the range of 12%-35% by weight of the water in the aqueous solution.

17. The method according to claim 1, wherein the treatment fluid further comprises a cross-linking agent for the polysaccharide.

18. The method according to claim 1, wherein the treatment fluid further comprises a breaker.

19. A method for treating at least a portion of a well, the method comprising the steps of:
 (a) forming a treatment fluid comprising an aqueous solution, wherein the aqueous solution comprises:
  (i) water;
  (ii) a water-soluble polysaccharide;
  (iii) one or more water-soluble salts, wherein the one or more salts are selected and are in at least a sufficient concentration such that the water-salt solution has a density of at least 10 ppg; and
  (iv) urea;
 wherein the concentration of the urea in the water is in at least a sufficient concentration such that the aqueous solution is filterable, whereas an identical aqueous solution except with less than the sufficient concentration of the urea would not be filterable; and
 (b) introducing the treatment fluid into the well.

20. The method according to claim 19, wherein the aqueous solution has a G' of at least 2 Pa at a temperature of 30° C.

21. The method according to claim 19, wherein the polysaccharide is selected from the group consisting of diutan, xanthan, and any combination thereof in any proportion.

22. The method according to claim 19, wherein the polysaccharide is in a concentration at least 0.1% by weight of the water in the aqueous solution.

23. The method according to claim 19, wherein the polysaccharide is in a concentration in the range of 0.1% to 1.0% by weight of the water in the aqueous solution.

24. The method according to claim 19, wherein the one or more salts are selected from the group consisting of sodium bromide, sodium chloride, calcium bromide, calcium chloride, zinc bromide, zinc chloride, and any combination thereof in any proportion.

25. The method according to claim 19, wherein the water-salt solution has a density in the range of 10.5 ppg-15.5 ppg.

26. The method according to claim 19, wherein the urea is in a concentration of at least 5% by weight of the water in the aqueous solution.

* * * * *